(12) United States Patent
Guglielmo

(10) Patent No.: US 9,068,855 B1
(45) Date of Patent: Jun. 30, 2015

(54) COUNTER-PORPOISING WATERCRAFT ATTITUDE CONTROL SYSTEM

(75) Inventor: Kennon Guglielmo, San Antonio, TX (US)

(73) Assignee: Enovation Controls, LLC, Tulsa, OK (US)

( * ) Notice: Subject to any disclaimer, the term of this patent is extended or adjusted under 35 U.S.C. 154(b) by 125 days.

(21) Appl. No.: 13/356,493

(22) Filed: Jan. 23, 2012

Related U.S. Application Data

(60) Provisional application No. 61/435,106, filed on Jan. 21, 2011.

(51) Int. Cl.
*G05D 1/00* (2006.01)
*G01C 21/36* (2006.01)

(52) U.S. Cl.
CPC .................................. *G01C 21/36* (2013.01)

(58) Field of Classification Search
None
See application file for complete search history.

(56) References Cited

U.S. PATENT DOCUMENTS

| | | | |
|---|---|---|---|
| 4,261,278 A | 4/1981 | Gaudin | |
| 4,708,672 A | 11/1987 | Bentz et al. | |
| 4,749,926 A | 6/1988 | Ontolchik | |
| 4,908,766 A | 3/1990 | Takeuchi | |
| 4,940,433 A | 7/1990 | Raber | |
| 5,107,786 A | 4/1992 | Templeman | |
| 5,113,780 A | 5/1992 | Bennett et al. | |
| 5,142,473 A | 8/1992 | Davis | |
| 5,203,727 A | 4/1993 | Fukui | |
| 5,263,432 A | 11/1993 | Davis | |
| 5,474,012 A | 12/1995 | Yamada et al. | |
| 5,488,919 A | 2/1996 | Ferreiro et al. | |
| 5,647,780 A * | 7/1997 | Hosoi | 440/53 |
| 5,809,436 A | 9/1998 | Gregory | |
| 6,138,601 A | 10/2000 | Anderson et al. | |
| 6,273,771 B1 | 8/2001 | Buckley et al. | |
| 6,702,629 B2 | 3/2004 | Adamczyk | |
| 7,018,252 B2 | 3/2006 | Simard et al. | |
| 7,128,014 B2 * | 10/2006 | Berthiaume et al. | 114/253 |
| 7,311,058 B1 | 12/2007 | Brooks et al. | |
| 7,465,203 B2 | 12/2008 | Walser et al. | |
| 7,494,394 B2 | 2/2009 | Walser et al. | |
| 7,565,876 B2 | 7/2009 | Wilson et al. | |
| 8,261,682 B1 | 9/2012 | DeVito | |
| 8,457,820 B1 * | 6/2013 | Gonring | 701/21 |
| 2008/0072811 A1 | 3/2008 | Patterson | |
| 2008/0164370 A1 * | 7/2008 | Walden et al. | 244/30 |
| 2008/0167768 A1 | 7/2008 | Rubenstein et al. | |
| 2009/0209153 A1 * | 8/2009 | Walser et al. | 440/87 |
| 2010/0094491 A1 * | 4/2010 | Oehlgrien et al. | 701/21 |
| 2010/0198435 A1 * | 8/2010 | Cansiani et al. | 701/21 |

OTHER PUBLICATIONS

'A Guide to using IMU Accelerometer and Gyroscope Devices in Embedded Applications', Feb. 6, 2010, Starlino.*

* cited by examiner

*Primary Examiner* — Thomas Tarcza
*Assistant Examiner* — Garrett Evans
(74) *Attorney, Agent, or Firm* — William H. Quirk; Daniel A. Rogers; Rosenthal Pauerstein Sandolski Agather LLP

(57) ABSTRACT

A watercraft attitude control system using GPS and other motion inputs in order to predictively control thrust, steering and hull characteristics in ways that will prevent and minimize porpoising motion of a watercraft.

21 Claims, 4 Drawing Sheets

COUNTER-PORPOISING WATERCRAFT ATTITUDE CONTROL SYSTEM

CLAIM OF PRIORITY TO PRIOR APPLICATION

This application claims the benefit of the filing date of U.S. Provisional Application Ser. No. 61/435,106, filed on Jan. 21, 2011, entitled "Counter-Porpoising Watercraft Attitude Control System", the entire disclosure of which is hereby incorporated by reference into the present disclosure.

NONPUBLICATION REQUESTED

Non-Provisional Application

This application is a non-provisional application under 37 CFR 1.53(b) and is submitted with an accompanying nonpublication request in accordance with 35 U.S.C. §122(b). Accordingly, the subject matter of this application is to be maintained in secrecy until and unless Applicant allows a patent to issue based on this application.

BACKGROUND

1. Field of the Invention

The present invention primarily pertains to the field of watercraft and boating. More particularly, many aspects of the present invention pertaining to controlling the pitch attitude of powered watercraft moving through the water.

2. Related Art

Watercraft "porpoising" refers to excessive rise-and-fall motion of a boat while motoring across a body of water at otherwise steady velocity. Virtually every recreational boater experiences it from time to time without much bother, but it can be dangerous, especially if it becomes harmonic with a series of waves. To make matters worse, porpoising can increase unexpectedly and uncontrollably even though engine speed and other boat controls are being held constant.

Consider a traditional V-shaped hull moving on a straight path through the water. Ideally the boat reaches the intended speed and everything stays smooth and steady. A large body of water, however, is rarely smooth, and the nautical forces acting on a boat are anything but steady. Buoyancy and drag forces vary depending largely on how much of the hull is submerged. Meanwhile, the thrust from the boat's propulsion system may be fixed relative to the boat, but if a wave changes the boat's pitch, then the thrust pushes the hull out of or into the water. So, once a sizeable waves changes the boat's pitch and position relative to the water, the forces on the hull of the boat are dramatically varied.

The boat's pitch begins to oscillate as the boat rises and falls, because fore and aft buoyancy forces against the hull start varying dramatically once the oscillating motion of porpoising has commenced. As the bow moves down into the water, the bow area displacement and the surface area impinged by moving water both increase, and generate upward forces on the bow. When the upward forces from the water overcome the downward force from the propulsive thrust, the bow pitches up. As it does, the bow displacement decreases and the lifting forces decrease, but the propulsive thrust lifting the stern increases. Thereafter, propulsive thrust and inertia drive the bow back into the water below a steady state displacement level. Hence, without intervention, the porpoising cycle continues.

Mild to moderate porpoising can adversely affect fuel consumption, steering, passenger comfort, engine wear, and other matters. In severe porpoising, the pitch oscillations may damage equipment and injure passengers and crew. A control system that can reduce or prevent porpoising is desirable to avoid its adverse effects.

Modulating the available control mechanisms such as trim tabs or thrust adjustments (i.e., throttle or cruise control interventions) is also difficult to achieve accurately because the resulting forces act on multiple axes that are displaced from the boat's center of gravity. If trim tabs or buoyancy propels the stern upward from the water, then the bow is forced down. There are multiple factors that affect porpoising including boat speed, hull design, thrust angle, propeller type, boat loading, wind, waves, and more Even assuming that porpoising is already being managed to a minimum, watercraft operators such as those using recreational boats may also wish to control the boat to achieve a particular pitch attitude of their boats. While such needs arise in various circumstances, ski boat operators for instance may want to alter the size of the boat's wake. In wakeboarding, a large wake allows the wakeboarder to jump higher in the air. However, if the boat creates large wakes while transiting to a wakeboarding area, the wake may damage moored or docked vessels, damage piers and shoreline, or disturb other boaters. A small wake may be desirable when transiting, trolling, water skiing, wakeskating, or performing other activities. A smaller wake contains less energy, and thus carries less risk of damaging impinged structures. Further, for a given speed, a smaller wake indicates less propulsive energy is being diverted into wave-making energy, and thus reflects increased fuel efficiency. Some existing systems and methods enable watercraft operators to vary the craft's attitude, but each has significant limitations such as cost, weight, inflexibility, slow response, excess operator intervention, unpredictable results, and the like.

DETAILED DESCRIPTION OF PREFERRED EMBODIMENTS

Information Incorporated By Reference

This description incorporates by reference the entire disclosures of U.S. Pat. No. 7,465,203 dated Dec. 16, 2008, entitled "Watercraft Speed Control Device," and U.S. Pat. No. 7,494,394 dated Feb. 24, 2009 entitled "Watercraft Speed Control Device."

Various preferred embodiments of the present invention will be implemented in recreational boats, which for these purposes includes all watercraft in the common understanding of ski boats, sport ski boats (also known as "sport/ski" or "sport-ski" boats), tow boats, recreational fishing boats, or any comparable watercraft. Recreational boats include all boats designed and/or used for purposes such as fishing, cruising, patrolling, transport or the like, as well as for towing recreational or competition water skiers, barefooters, kites, wakeboarders, or tubers. It should be recognized that a boat may bear a common classification relating to a particular purpose irrespective of how its owner might choose to use the boat.

Figure 1:
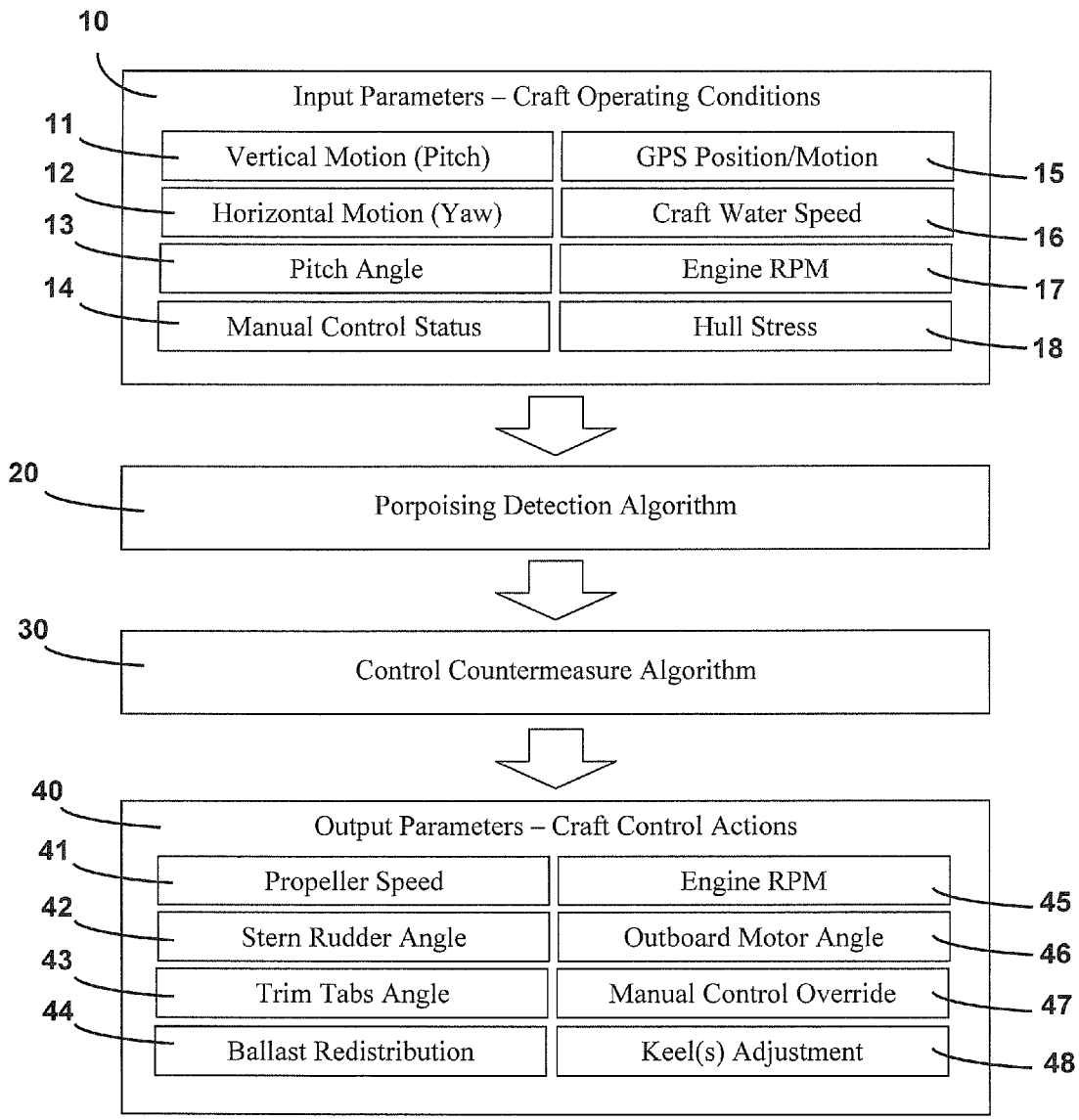
FIG. 1 is a conceptual flowchart for a control system of preferred embodiments, illustrating the conceptual relationship between various input parameters 10 and output parameters 40 that affect the attitude and motion of a watercraft.

With reference to FIG. 1, watercraft 200 is preferably a recreational boat containing a variety of presently available sensors to sense and transmit various craft operating conditions (sensed conditions) depicted as the input parameters 10. For example, in the preferred embodiment as depicted in FIG. 1 the craft 200 has sensors that detect the vertical motion (pitch), horizontal motion (yaw), pitch angle, manual control status, GPS position and motion of the craft 200, the craft water speed, the craft engine RPM and the hull stress of the craft 200. A set of corresponding sensors (11, 12, 13, 14, 15, 16, 17, 18) are depicted schematically with minimal specificity on FIG. 1. The presently described embodiment of the invention uses a number of presently available components including controls, actuators, sensors, and communication means to provide the input parameters containing information regarding the craft operating conditions.

Those skilled in the art will have understanding of the various configurations, combinations, and subcombinations of sensors and input parameters 10 that may not have been specifically disclosed but would fall within the scope of the invention. It should be understood, though, that such sensors come in many forms and may include accelerometers, angle sensors, angle position sensors, encoders, strain gauges, electronic devices, and any other means known to or later discovered by those of skill in the art to detect and report conditions of the corresponding devices and operating and environmental conditions. It should also be understood that many such sensors may be integral with accompanying actuators or other components even though they may be shown discreetly. Also, understand that equivalent sensors may approximate sensing of the intended object by approximating from other indicators or other algorithms.

Additionally, such other embodiments may contain a different combination of sensors providing a different combination of measurements of the craft operating conditions. All such sensors communicate their information to a FIG. 2 microprocessor microcontroller 50.

Microprocessor Microcontroller

The microprocessor microcontroller 50 uses one or more presently available computing devices that contain a processor, memory, one or more input means, and one or more output means. The microprocessor microcontroller 50 preferably stores part, or all, of the porpoising detection algorithm 20 and the control countermeasure algorithm 30. The microprocessor microcontroller 50 receives information on the sensed conditions and detects the presence or absence and degree of porpoising according to the porpoising detection algorithm 20. When the porpoising detection algorithm 20 indicates the presence of porpoising, the microprocessor microcontroller 50 calculates the most desired control countermeasures according to the control countermeasure algorithm 30. The microprocessor microcontroller 50 then outputs craft control actions communicating the appropriate output parameters 40 to the appropriate controllers that affect craft 200.

Referring again to FIG. 1, preferred embodiments of the present invention will contain a variety of presently available craft controllers to accept the output parameters 40. For example, in the preferred embodiment as depicted in FIG. 1 the craft 200 has controllers that can modify the propeller speed 41, stern rudder angle 42, trim tabs angle 43, ballast redistribution 44, engine RPM 45, outboard motor angle 46, manual control override 47, and keel(s) adjustment (48).

As with the input parameters 10, those skilled in the art will have understanding of the various configurations, combinations, and subcombinations of controllers and output parameters 40 that may not have been specifically disclosed but would fall within the scope of the invention. It should be understood, though, that such controllers come in many forms.

Porpoising Detection Algorithm

A porpoising detection algorithm 20 is preferably implemented in the microprocessor microcontroller 50. The porpoising detection algorithm 20 may include any common or advanced control loop transfer function including, but not limited to, series, parallel, ideal, interacting, noninteracting, analog, classical, and Laplace types. The porpoising detection algorithm 20 calculates absence or presence of porpoising in the craft 200 and if present the degree of porpoising using the input information received by the input parameters 10.

Control Countermeasure Algorithm

A control countermeasure algorithm 30 is preferably implemented in the microprocessor microcontroller 50. The control countermeasure algorithm 30 may include any common or advanced control loop transfer function including, but not limited to, series, parallel, ideal, interacting, noninteracting, analog, classical, and Laplace types. The control countermeasure algorithm 30 receives information on the presence and degree of porpoising from the porpoising detection algorithm 20. In the presences of porpoising, the control countermeasure algorithm 30 calculates optimal craft control actions to minimize, reduce, or eliminate the porpoising. The control countermeasure algorithm 30 then outputs the correct craft control actions to the appropriate output parameter 40 craft controllers.

The control countermeasure algorithm 30 is optimized to achieve accurate modulation of the available control mechanisms such as trim tabs or thrust adjustments (i.e., throttle or cruise control interventions). By using the information from the input parameters 10, the control countermeasure algorithm 30 can be tuned to calculate the craft control actions that optimize fuel consumption, steering, passenger comfort, engine wear, and other matters.

Based on the input information, the control countermeasure algorithm 30 calculates craft control actions for any of the craft controllers implemented in the particular embodiment. For each craft controller it is controlling, the control countermeasure algorithm 30 calculates a desired action and a corresponding craft controller command to achieve as much. The control countermeasure algorithm 30 calculates the desired action based on the sensed conditions. However, because of the inherent limits of the steering system or other craft conditions, the desired action may not be achievable, either instantaneously or at all. A craft controller action limiting function may also be implemented in the control countermeasure algorithm 30 or by some other means, or may not be necessary based on the type of the craft controls for craft 200.

The control countermeasure algorithm 30 preferably includes a comparator function with which the control countermeasure algorithm 30 compares the desired craft control action with the current craft conditions as detected by input parameter sensors. The control countermeasure algorithm 30 produces a series of intermediate craft control actions that achieve the desired craft control actions without exceeding the craft control system's maximum permissible rate of change or operating limits. Further, the control countermeasure algorithm 30 is adapted to limit the craft control actions to the mechanical limits of watercraft 200. The control countermeasure algorithm 30 also preferably contains a smoothing function to avoid rapid changes in craft control actions. The smoothing function compensates for noise in sensors or controls and for rapid fluctuations in sensed conditions.

The control countermeasure algorithm 30 is based on mathematical models for the resulting forces acting on the multiple axes of the watercraft 200 during porpoising. Formulas to approximate these forces are known in the art. However, numerous complexities affecting these forces also exist such as hull interaction with flow around the rudder (hull wake), rudder physical profile (e.g., hydrofoil shape, chord length, rudder thickness), turbulence of inflow to the rudder, and other factors. These complexities are preferably approximated in the control countermeasure algorithm 30 using constants. The constants of control countermeasure algorithm 30 may be tuned for different types of watercraft 200 through experimentation and testing.

Irrespective of the other preferred details in the porpoising detection algorithm 20 and the control countermeasure algorithm 30, both algorithms monitor a variety of sensed conditions to determine when porpoising is occurring and what craft control actions are needed to reduce or eliminate porpoising. The control countermeasure algorithm 30 also includes internal limitations for other operating and safety considerations. For example, regardless of sensed conditions, the control countermeasure algorithm 30 never commands a craft control action in excess of the mechanical or safety limits of the craft 200 or the specifically controlled subsystem. In case of certain sensor failures, the electronic controller informs the operator a failure has occurred and calculates the optimal craft control actions to minimize, reduce, or eliminate the porpoising taking into account the failure. In case of microprocessor microcontroller 50, fail-safe means allows the watercraft's manual steering system to resume unaided control of the craft 200.

Depiction of Input and Output Parameters in Other Embodiments

Figure 2:
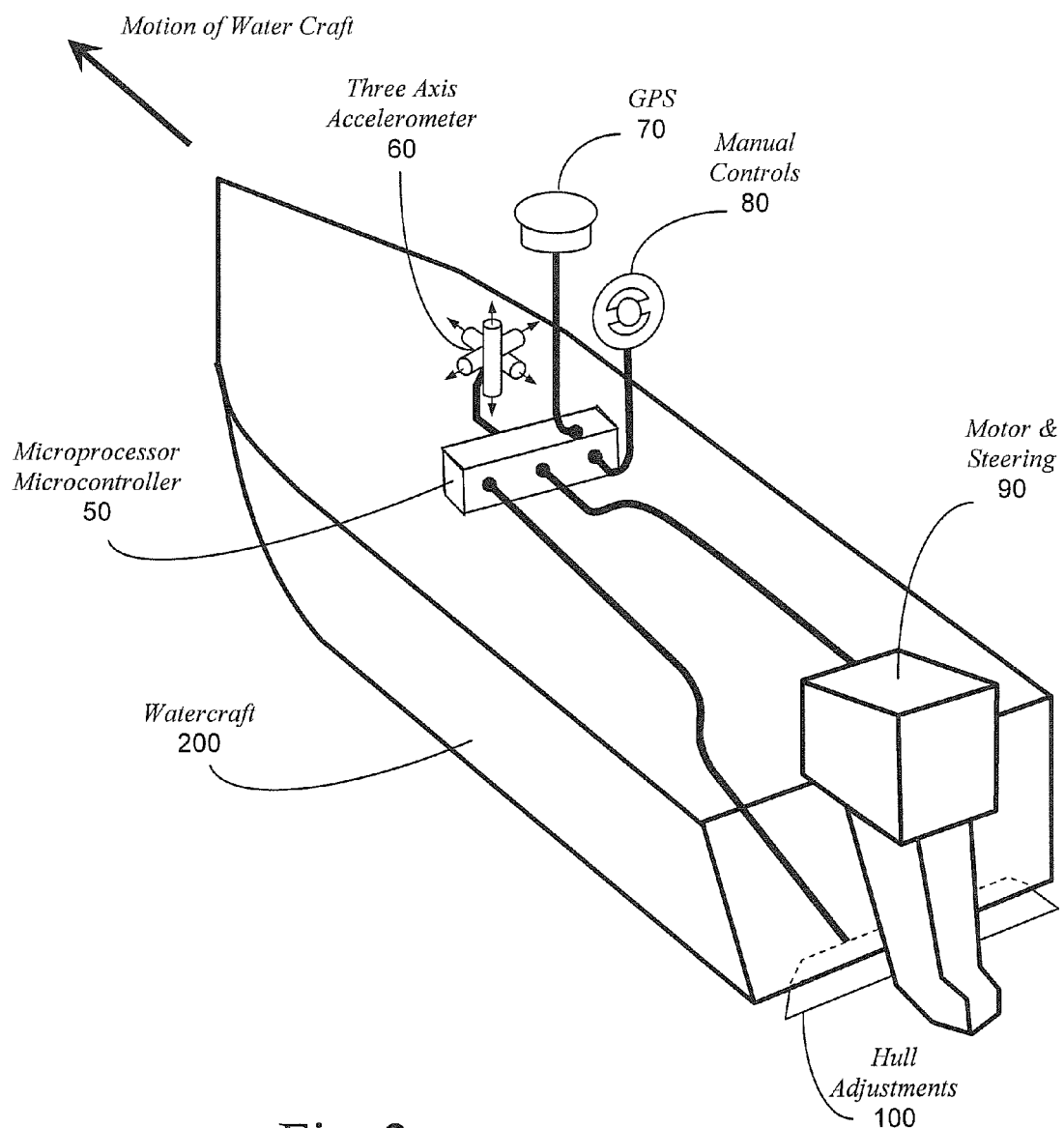
FIG. 2 is a schematic illustration of watercraft 200 of preferred embodiments, illustrating microcontroller 50 in relation to various control systems 60, 70, 80, 90, 100 that detect and affect the attitude and motion of watercraft 200.
Figure 3:
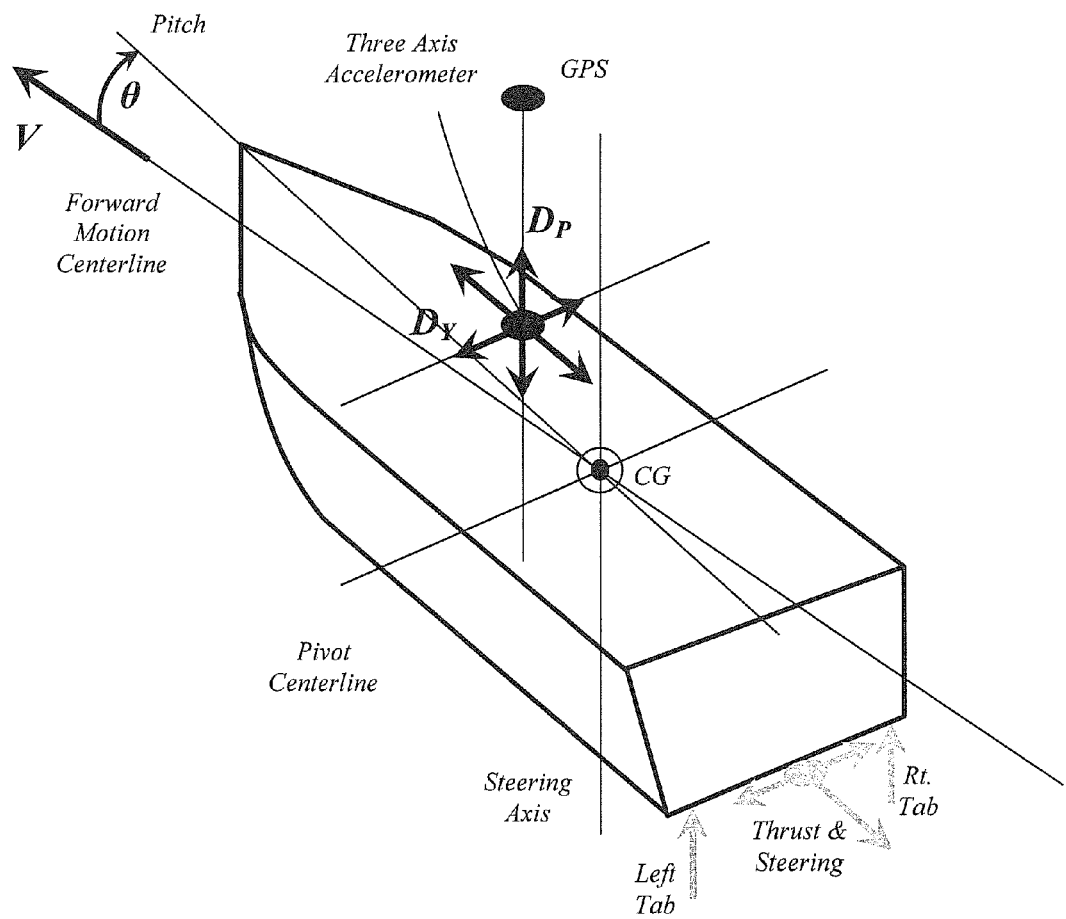
FIG. 3 provides a relational orientation for reference to watercraft 200, illustrating the pitch of watercraft 200 as well as the conceptual positional relationship between the watercraft's center of gravity and various control systems, namely a three-axis accelerometer, thrust and steering systems, and left and right hull tabs.

FIG. 2 depicts an example of one possible configuration, combination, or subcombination of input parameters 10 and output parameters 40 of other embodiments of the invention. In FIG. 2, a three axis accelerometer 60 provides measurements of the movement of the watercraft 200 in three dimensions to the microprocessor microcontroller 50. This provides information corresponding to the input parameters 10 vertical motion (pitch) 11, horizontal motion (yaw) 12, pitch angle 13. A GPS 70 provides information regarding the GPS position/motion 15 and the craft water speed 16 to the microprocessor microcontroller 50. In addition to the input parameters 10 listed above, a sensor detecting the status of the manual controls 80 provides this information to the microprocessor microcontroller 50. Finally, a sensor relates information about the engine RPM from the motor & steering 90 to the microprocessor microcontroller 50.

With the information provided by the input parameters described above the microprocessor microcontroller 50 continually runs the porpoising detection algorithm 20. Once the presence of porpoising has been indicated by the porpoising detection algorithm 20, microprocessor microcontroller 50 runs the control countermeasure algorithm 30. The control countermeasure algorithm 30 calculates optimal craft control actions to minimize, reduce, or eliminate the porpoising and outputs the correct craft control actions to the appropriate output parameter 40 craft controllers.

In this embodiment, the microprocessor microcontroller 50 outputs craft control actions to motor & steering unit 90 and to the mechanisms providing hull adjustments 100. Such hull adjustments may be accomplished by, for example, an aft rudder. The microprocessor microcontroller 50 may also use the manual controls 80 as a craft control device. In this embodiment, the microprocessor microcontroller 50 outputs control actions adjusting propeller speed 41, engine RPM 45, and outboard motor angle 46 to the motor & steering 90 unit. The microprocessor microcontroller 50 also outputs craft control actions adjusting stern rudder angle 42 and trim tabs angle 43 to the hull adjustments 100. The microprocessor microcontroller 50 can also send manual control override 47 actions to the manual controls 80.

It should be noted that in this embodiment, the certain of the various input and output parameters may share input parameter signal pathways with the corresponding output parameters craft control action signal pathways. Specifically the motor & steering sensor 90, the hull adjustments 100, and the manual controls 80 each potentially shares an input parameter signal transmission pathway with its corresponding output parameter craft control action pathway.

Diagram of Input and Output Parameters in Other Embodiments

Figure 4:
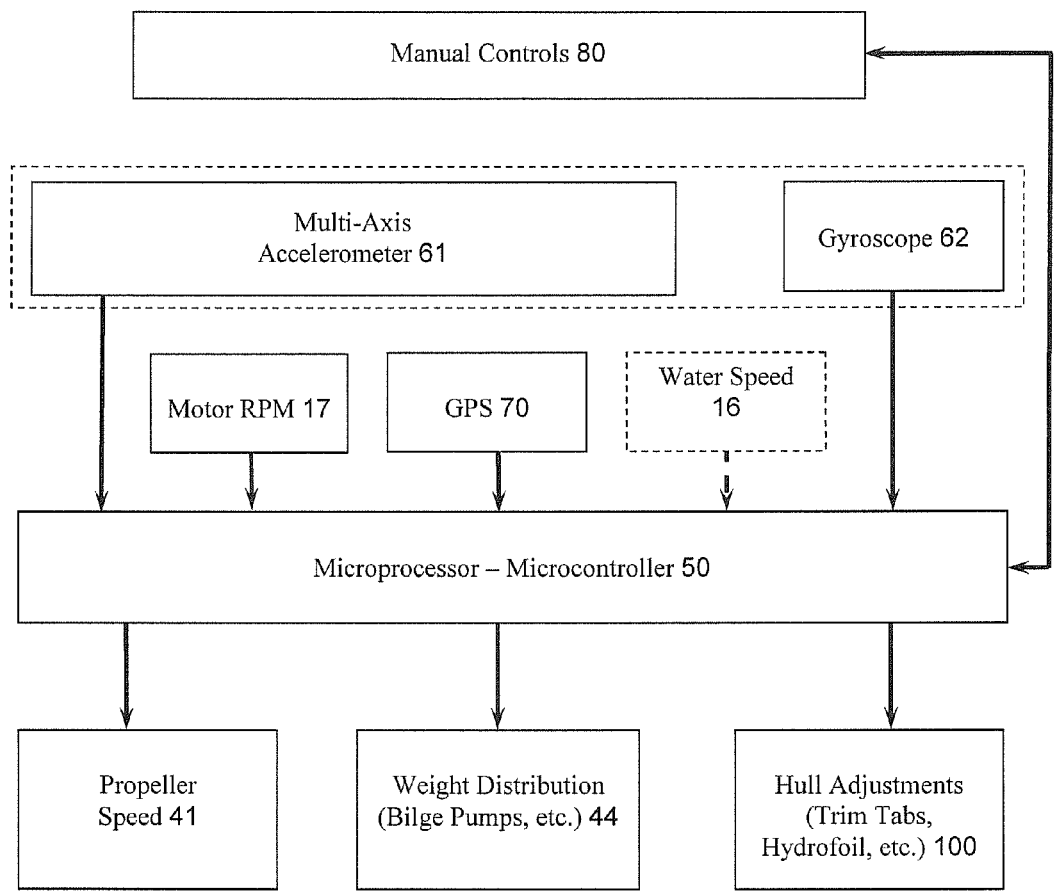
FIG. 4 provides a diagram of the control system of watercraft 200, illustrating manual controls 80 and microcontroller 50 in relation to inputs 16, 17, 61, 62, and 70 as well as outputs 41, 44 and 100.

FIG. 4 is a diagram of another embodiment configuration, combination, or subcombination of input parameters 10 and output parameters 40. In FIG. 4, each box corresponds to a discrete sensor box or unit that may be placed in separate locations in the watercraft 200. This provides information from various locations on the craft 200 to the microprocessor microcontroller 50. There may also be multiple sensor box units of the same or similar sensor types placed in various locations in the water craft 200 to provide more information about the motions and forces the craft 200 is experiencing to the microprocessor microcontroller 50.

In FIG. 4, a multi axis accelerometer 61 provides measurements of the movement of the watercraft 200 in multiple dimensions to the microprocessor microcontroller 50. Additionally, a gyroscope 62 provides information measuring or maintaining orientation, based on the principles of angular momentum. Note also that the multi axis accelerometer 61 sensor box is shown in dashed-line with the gyroscope 62 indicating that these sensors may be paired as a unit or may be separate. Additional sensors include a water speed 16 sensor, a GPS 70, a sensor detecting the status of the manual controls 80, and a sensor relating information about the engine RPM 17 to the microprocessor microcontroller 50. Also, note that the water speed 17 sensor box is shown in dashed-line because it is less critical, particularly given that we usually depend on GPS to get water speed.

As also reflected in FIG. 4, the multi axis accelerometer 61 module is shown as one box that is positioned forward (or aft, as an alternative) of the boat's center of gravity CG. It should be understood, though, that the accelerometer module as well as the gyro may be embodied either together in one housing or as multiple independent accelerometers and gyros spaced around the boat. Although keeping them in one location can be beneficial to cost and ease of installation, the spaced-around alternative allows the processor to take advantage of the fact that different locations will respond more or less dramatically to different hull motions based on where they are located. Irrespective, electronic and algorithmic adjustments will be evident to those skilled in the art in order to help compensate for wherever the various accelerometer and gyro components may be located.

As with other embodiments of the invention, the microprocessor microcontroller 50 continually runs the porpoising detection algorithm 20 using the information provided by the input parameters. Once the presence of porpoising has been indicated by the porpoising detection algorithm 20, microprocessor microcontroller 50 runs the control countermeasure algorithm 30. The control countermeasure algorithm 30 calculates optimal craft control actions to minimize, reduce, or eliminate the porpoising and outputs the correct craft control actions to the appropriate output parameter 40 craft controllers.

In this embodiment the microprocessor microcontroller 50 outputs craft control actions to the propeller speed 41 module, the weigh distribution 44 module (that may control bilge pumps or other appropriate devices), and the hull adjustments 100 module.

Alternative Components

Even though the foregoing embodiments represent the most preferred at present, those of ordinary skill in the art will recognize many possible alternatives that we have not expressly suggested here. While the foregoing written descriptions enable one of ordinary skill to make and use what is presently considered the best modes of the invention, those of ordinary skill will understand and appreciate the existence of variations, combinations, and equivalents of the specific embodiment, method, and examples herein. The drawings and detailed descriptions herein are illustrative, not exhaustive. They do not limit the invention to the particular forms and examples disclosed. To the contrary, the invention includes any further modifications, changes, rearrangements, substitutions, alternatives, design choices, and embodiments apparent to those of ordinary skill in the art, without departing from the spirit and scope of this invention, as defined by any claims included herewith or later added or amended in an application claiming priority to this present filing. The invention covers all embodiments within the scope and spirit of such claims, irrespective of whether such embodiments have been remotely referenced here or whether all features of such embodiments are known at the time of this filing. Thus, the claims should be interpreted to embrace all further modifications, changes, rearrangements, substitutions, alternatives, design choices, and embodiments that may be evident to those of skill in the art. In any case, all substantially equivalent systems, articles, and methods should be considered within the scope of the present invention.

I claim:

1. A watercraft control system for reducing uncontrolled pitch oscillations of a watercraft, wherein the watercraft has an engine for propulsion, said watercraft control system comprising:
   (a) a sensor, or a combination of sensors, configured for providing a signal output relating to the pitch acceleration of said watercraft;
   (b) a data processor configured to receive said signal output;
   (c) a weight distribution actuator configured for redistributing the weight of said watercraft;
   (d) said data processor being programmed
      (i) to detect oscillations in the motion of said watercraft based at least in part on said signal output from said sensor or combination of sensors; and
      (ii) to control said weight distribution actuator to effect a reduction in oscillations in the motion of said watercraft;
   (e) a velocity determiner configured for determining the velocity of said watercraft; and
   (f) a controller adapted to actuate said weight distribution actuator in response to oscillations detected by said data processor, based on said signal output, and based on output from said velocity determiner, whereby said weight distribution actuator causes a reduction in oscillations in the motion of said watercraft.

2. A watercraft control system as in claim 1, wherein said controller is adapted to allow manual override of actuation of said weight distribution actuator.

3. A watercraft control system as in claim 1, further comprising an engine speed controller adapted to determine and implement one or more adjustments to the output speed of said engine in response to oscillations detected by said data processor, said one or more adjustments being determined by said engine speed controller based on said signal output and based on output from said velocity determiner.

4. A watercraft control system as in claim 1, further comprising a propeller speed adjustment actuator.

5. A watercraft control system as in claim 1, wherein said weight distribution actuator comprises a water pump for moving water to change the location of a center of gravity of said watercraft.

6. A watercraft control system as in claim 1, wherein said weight distribution actuator further comprises a pump and a liquid conduit for conveying water from a tank of said watercraft in order to change the location of a center of gravity of said watercraft.

7. A watercraft control system as in claim 1, wherein said weight distribution actuator further comprises:
   (a) at least one ballast pump in fluid communication with one or more ballast chambers on or in said watercraft;
   (b) at least one ballast chamber fill sensor configured for obtaining a measurement of the ballast in each of said one or more ballast chambers;
   (c) a ballast pump controller in association with said at least one ballast pump and with said at least one ballast chamber fill sensor, said ballast pump controller being configured for varying the ballast in each of said one or more ballast chambers.

8. A watercraft control system as in claim 1, further comprising an engine thrust angle controller.

9. A watercraft control system as in claim 8, wherein said engine thrust angle controller comprises a motor for adjusting a thrust angle of an outboard thrust propeller for said watercraft.

10. A watercraft control system for controlling the pitch attitude of a recreational boat, wherein said recreational boat has an engine for propulsion, said watercraft control system comprising:
   (a) a velocity measuring device configured for obtaining a first measurement of the velocity magnitude of said recreational boat;
   (b) a GPS device configured for obtaining a second measurement of the velocity magnitude of said recreational boat;
   (c) an engine speed algorithm configured for creating a first engine speed output correction from said first velocity measurement, said second velocity measurement, and a currently desired velocity; said first engine speed output correction being configured for causing said recreational boat to be propelled at substantially said currently desired velocity;
   (d) a weight distribution actuator configured for redistributing the weight of said recreational boat, said weight distribution actuator comprising at least one ballast pump in fluid communication with one or more ballast chambers on or in said recreational boat;

(e) at least one ballast chamber fill sensor configured for obtaining a measurement of the ballast in each of said one or more ballast chambers;
(f) a ballast algorithm in communication with said at least one ballast chamber fill sensor and with said at least one ballast pump, said ballast control algorithm configured for varying the ballast in each of said one or more ballast chambers;
(g) a sensor, or combination of sensors, configured for providing a signal output relating to the pitch of said recreational boat;
(h) a data processor configured to receive said signal output;
(i) said data processor being programmed
  (i) to detect oscillations in the motion of said recreational boat based at least in part on the signal output from said sensor or combination of sensors; and
  (ii) to control said weight distribution actuator to effect a reduction in oscillations in the motion of said recreational boat in response to detected oscillations and based at least in part on a measurement of the velocity magnitude of said recreational boat;
(j) a controller adapted to actuate said weight distribution actuator in response to oscillations detected by said data processor based on said signal output, and based on output from said velocity measuring device or said GPS device, whereby said weight distribution actuator causes a reduction in oscillations in the motion of said recreational boat;
(k) trim tabs attached to said recreational boat, the deflection of said trim tabs being variable during operation of said recreational boat;
(l) a trim tab algorithm in communication with said trim tabs, said trim tab algorithm configured for varying said deflection of said trim tabs in response to said measurement of the pitch acceleration of said recreational boat;
(m) a tilt sensor configured for obtaining a measurement of angular tilt in the pitch axis of said recreational boat; and
(n) a tilt algorithm, in communication with said ballast algorithm, said trim tab algorithm, and said engine speed algorithm, where said tilt algorithm is configured for varying and substantially maintaining said angular tilt of said recreational boat while substantially maintaining said currently desired velocity of said recreational boat.

11. A watercraft control system for controlling the pitch attitude of a recreational boat, wherein said recreational boat has an engine for propulsion, said watercraft control system comprising:
(a) a velocity measuring device configured for obtaining a first measurement of the velocity magnitude of said recreational boat;
(b) a GPS device configured for obtaining a second measurement of the velocity magnitude of said recreational boat;
(c) an engine speed algorithm configured for creating a first engine speed output correction from said first velocity measurement, said second velocity measurement, and a currently desired velocity; said first engine speed output correction being configured for causing said recreational boat to be propelled at substantially said currently desired velocity;
(d) a weight distribution actuator configured for redistributing the weight of said recreational boat, said weight distribution actuator comprising at least one ballast pump in fluid communication with one or more ballast chambers on or in said recreational boat;
(e) at least one ballast chamber fill sensor configured for obtaining a measurement of the ballast in each of said one or more ballast chambers;
(f) a ballast algorithm in communication with said at least one ballast chamber fill sensor and with said at least one ballast pump, said ballast control algorithm configured for varying the ballast in each of said one or more ballast chambers;
(g) trim tabs attached to said recreational boat, the deflection of said trim tabs being variable during operation of said watercraft;
(h) an engine thrust angle controller;
(i) an inertia measurement device configured for obtaining a measurement of the pitch acceleration of said recreational boat;
(j) a tilt sensor configured for obtaining a measurement of angular tilt in the pitch axis of said recreational boat; and
(k) a trim tab algorithm in communication with said trim tabs, said trim tab algorithm configured for varying said deflection of said trim tabs in response to said measurement of the pitch acceleration of said recreational boat;
(l) a data processor configured to receive a signal output from said inertia measurement device;
(m) said data processor being programmed
  (i) to detect oscillations in the motion of said recreational boat based at least in part on the signal output from said inertia measurement device; and
  (ii) to control said weight distribution actuator to effect a reduction in oscillations in the motion of said recreational boat;
(n) a controller adapted to actuate said weight distribution actuator in response to oscillations detected by said data processor, based on said signal output, and based on output from said velocity measuring device or said GPS device, whereby said weight distribution actuator causes a reduction in oscillations in the motion of said recreational boat; and
(o) a tilt algorithm, in communication with said ballast algorithm, said trim tab algorithm, and said engine speed algorithm, where said tilt algorithm is configured for varying and substantially maintaining said angular tilt of said recreational boat while substantially maintaining said currently desired velocity of said recreational boat.

12. A watercraft control system as in claim 10, wherein said controller is adapted to allow manual override of actuation of said weight distribution actuator.

13. A watercraft control system as in claim 10, further comprising an engine speed controller adapted to determine and implement one or more adjustments to the output speed of said engine in response to oscillations detected by said data processor, said one or more adjustments being determined by said engine speed controller based on said signal output and based on output from said velocity measuring device or said GPS device.

14. A watercraft control system as in claim 11, wherein said controller is adapted to allow manual override of actuation of said weight distribution actuator.

15. A watercraft control system as in claim 11, further comprising an engine speed controller adapted to determine and implement one or more adjustments to the output speed of said engine in response to oscillations detected by said data processor, said one or more adjustments being determined by said engine speed controller based on said signal output and based on output from said velocity measuring device or said GPS device.

16. A watercraft control system as in claim 11, wherein said engine thrust angle controller comprises a motor for adjusting a thrust angle of an outboard thrust propeller for said recreational boat.

17. A watercraft control system for reducing uncontrolled pitch oscillations of a watercraft, wherein the watercraft has an engine for propulsion, said watercraft control system comprising:
   (a) a sensor, or combination of sensors, configured for providing a signal output relating to the pitch acceleration of said watercraft;
   (b) a data processor configured to receive said signal output;
   (c) a hull adjustment actuator configured for adjusting the pitch of the hull of said watercraft;
   (d) said data processor being programmed
      (i) for detecting oscillations in the motion of said watercraft based at least in part on the signal output from said sensor or combination of sensors; and
      (ii) to control said hull adjustment actuator to effect a reduction in oscillation in the motion of said watercraft;
   (e) a velocity determiner configured for determining the velocity of said watercraft;
   (f) a controller adapted to actuate said hull adjustment actuator in response to oscillations detected by said data processor based on said signal output, and based on output from said velocity determiner, whereby said hull adjustment actuator causes a reduction in oscillation in the motion of said watercraft;
   (g) a weight distribution actuator configured for redistributing the weight of said watercraft;
   (h) said data processor being further programmed to control said weight distribution actuator to effect a reduction in oscillations in the motion of said watercraft;
   (i) a second controller adapted to actuate said weight distribution actuator in response to oscillations detected by said data processor, based on said signal output, and based on output from said velocity determiner, whereby said weight distribution actuator causes a reduction in oscillations in the motion of said watercraft;
   (j) an engine speed controller adapted to determine and implement one or more adjustments to the output speed of said engine in response to oscillation detected by said data processor, said one or more adjustments being determined by said engine speed controller based on said signal output and based on output from said velocity determiner;
   (k) a propeller speed adjustment actuator; and
   (l) an engine thrust angle controller, wherein said engine thrust angle controller comprises a motor for adjusting a thrust angle of an outboard thrust propeller for said watercraft.

18. A watercraft control system as in claim 17, wherein said weight distribution actuator further comprises:
   (a) at least one ballast pump in fluid communication with one or more ballast chambers on or in said watercraft; and
   (b) at least one ballast chamber fill sensor configured for obtaining a measurement of the ballast in each of said one or more ballast chambers.

19. A watercraft control system as in claim 17, wherein said hull adjustment actuator comprises:
   (a) trim tabs attached to said watercraft, the deflection of said trim tabs being variable during operation of said watercraft; and
   (b) a trim tab controller in communication with said trim tabs, said trim tab controller being configured for varying said deflection of said trim tabs in response to said measurement of the pitch acceleration of said watercraft.

20. A watercraft control system as in claim 17, wherein said hull adjustment actuator comprises a rudder.

21. A watercraft control system as in claim 17, wherein said controller is adapted to allow manual override of actuation of said hull adjustment actuator.

* * * * *